United States Patent [19]

Hasegawa et al.

[11] Patent Number: 4,774,404

[45] Date of Patent: Sep. 27, 1988

[54] OPTICAL PATH BLOCKAGE DETECTING DEVICE

[75] Inventors: Kazuo Hasegawa; Junichi Ohuchi; Hiroaki Sasaki, all of Furukawa, Japan

[73] Assignee: Alps Electric Co., Ltd., Japan

[21] Appl. No.: 20,022

[22] Filed: Feb. 27, 1987

[30] Foreign Application Priority Data

| Jul. 16, 1986 | [JP] | Japan | 61-108036[U] |
| Jul. 16, 1986 | [JP] | Japan | 61-108037[U] |
| Jul. 30, 1986 | [JP] | Japan | 61-115919[U] |
| Nov. 4, 1986 | [JP] | Japan | 61-168142[U] |
| Nov. 4, 1986 | [JP] | Japan | 61-168143[U] |

[51] Int. Cl.$^4$ .................... G08C 21/00; G01V 9/04
[52] U.S. Cl. ................................ 250/221; 250/227; 340/365 P; 340/712
[58] Field of Search ............... 250/221, 227, 574; 340/365 P, 555, 556, 557, 712; 350/96.10, 96.15

[56] References Cited

U.S. PATENT DOCUMENTS

| 4,333,704 | 6/1982 | Steinberg | 350/96.1 |
| 4,616,928 | 10/1986 | Leavitt et al. | 250/574 |
| 4,695,827 | 9/1987 | Beining et al. | 250/221 |

Primary Examiner—Edward P. Westin
Attorney, Agent, or Firm—Guy W. Shoup; Paul J. Winters

[57] ABSTRACT

An optical path blockage detecting device includes optical conductive members located between light emitting elements and light receptor elements and extending parallel to optical paths defined between the light emitting and receptor elements. Each optical conductive member is combined with a light absorbing member which absorbs undesired beams of light so as to improve the optical directivity of incident light and improve the signal-to-noise ratio of the device.

12 Claims, 8 Drawing Sheets

OPTICAL PATH BLOCKAGE DETECTING DEVICE

FIELD OF THE INVENTION

This invention relates to an optical path blockage detecting device such as an automatic door, security device, coordinate system input device or other device including light receptor elements and light emitting elements opposed to each other and defining optical paths therebetween to detect any blockage of the optical paths, and more particularly to an improved optical path blockage, detecting device specifically configured to prevent erroneous operation by blocking beams of light traveling toward the receptor elements through undesired angles.

BACKGROUND OF THE INVENTION

U.S. Pat. No. 3,842,260 discloses a prior art device for detecting blockage of optical paths.

U.S. Pat. No. 4,387,367 discloses a technology involving a problem of influences from light entering through undesired angles (external turbulent light) to which the present invention is directed.

U.S. Pat. Nos. 4,585,940, 4,490,801 and 4,243,879 disclose electrical and mechanical arrangements to overcome the problem.

A basic arrangement of the prior art optical sensor used in an optically activated automatic door is shown in FIG. 18 in which light emitting diodes (LED) or other light emitting elements and photo transistors or other light receptor elements are opposed and spaced by a distance. At inner positions of the light emitting elements 1 and light receptor elements 2 are mounted convergent lenses 103 and 104 made from acrylic resin or similar material. Since the convergent lenses 103 and 104 have a filtering function to permit selective transmission of invisible light such as infrared rays, an invisible optical path 5 is formed between the convergent lens 103 associated with the light emitting element 1 and the convergent lens 104 associated with the light receptor element 2. More specifically, a flux of light emitted from a light emitting portion 1a of the light emitting element 1 is focused by the lens 103 at the lens 104 which focuses the flux of light again at a light receptor portion 2a of the light receptor element 2. When a human body or other obstacle moves in between the space, the light path 5 is blocked, and the light blockage is detected. The convergent lenses 103 and 104 have a light converging function to prevent dispersion of beams of light and contributes to an improved detecting efficiency.

Some prior art optical sensors use high output light emitting elements to omit the convergent lens associated with the light emitting elements.

There are many kinds of coordinate input devices of electromagnetic induction type, electrostatic capacitance type, transparent electrode type, optical detection type and other types to manually input desired signals in a computer. Among them, the industry recognizes the high reliability and operability of the optical detection type device which is mounted on a front face of a display device so that a user can indicate a position on a coordinate system without contacting the detecting device, by simply putting his finger, etc. on a desired position on a display surface of the display device to block an optical path.

A prior art coordinate system input device of this type is shown in FIGS. 16, 19 and 20. FIG. 19 is a perspective view of the coordinate system input device mounted on a front face of a display device, FIG. 20 is a fragmentary cross-sectional view taken along a line including a light receptor element of the coordinate system input device, and FIG. 16 is a back elevation of the coordinate system input device from which a back plate is removed to expose the interior arrangement thereof.

The coordinate system input device generally comprises a frame member 201, arrays of LED or other light emitting elements 1, arrays of photo transistors or other light receptor elements 2 and an operational system 6. The frame member 201 is a rectangular molded member having an opening 202 at the center thereof. The light emitting elements 1 and light receptor elements 2 are mounted at the back of the frame member 201, i.e. between the frame member 201 and outer peripheries of a display surface 203a of a display device 203 including a cathode ray tube, etc. The operational system 6 detects the position of a blocked one of optical paths 5 formed by opposed light emitting elements 1 and light receptor elements 2 via an operating area A in a front portion of the display surface 203a and inputs the detected position in a host computer (not shown). Spaced and parallel arrays 214 of light emitting elements and spaced and parallel arrays 215 of light receptor elements form a frame-shaped array 213 of optical elements.

The light emitting elements 1 and light receptor elements 2 are fixed on a base board 207 mounted in the frame member 201 so that the light emitting portion 1a and the light receptor portion 2a of each associated pair of elements 1 and 2 are properly opposed. At the front face of the light receptor portions 2a of the light receptor elements 2 is placed a light shield 208 having light holes 208a of a predetermined diameter so that each light receptor element 2 receives light from associated one of the light emitting elements 1 and nothing else. An infrared ray filter 9 is mounted throughout the entire length of the rectangular outer margin of the operating area A and in front of the light shields 208 and light emitting elements 1 so as to selectively transmit infrared rays. Therefore, invisible optical paths 5 passing the infrared ray filter 9 are formed in the operating area A near the display surface 203a.

The following explanation is directed to how a coordinate system is inputted by the coordinate input device having the aforegoing arrangement. As shown in FIG. 19, when a finger 211 touches a desired position on the display surface 203a, the optical path 5 passing the position of the finger is blocked, and a coordinate system position is specified. More specifically, when the light emitting elements 1 in the array 214 sequentially emit light and scan the optical paths, and the optical path 5 blocked by the finger is detected by the light receptor element 2 as specific positions in X and Y directions. The blocked optical path 5 is defined by the operational system 6, and the specific position on the coordinate system is entered in a host computer (not shown).

In the described prior art, however, the directivity of light entering in the operating area A from the light emitting elements 1 is bad. Beside this, the light holes 208a must have sufficient diameter so as not to impair a required detection efficiency. However, such holes cannot ensure a sufficient optical directivity, and light from a light emitting element 1 sometimes reaches the wrong light receptor elements and causes an erroneous operation of the device.

Some other prior art devices use a light shield holder 216 shown in FIG. 17 in lieu of the light shield 208 to place the light receptor elements 2 in the light shield holder 216 so that light reaches the light receptor elements through light holes 216a. In this case, however, undesired light entering through a course other than the optical path 5 is reflected by inner walls of the light shield holder 216 and reaches the light receptor portions 2a. Therefore, this cannot improve the optical directivity yet.

In this connection, the inventors proposed a coordinage system input device shown in FIGS. 14 and 15 in which an infrared ray filter 9 itself has focusing portions formed integrally therewith along one surface thereof opposed to the operating area A. The focusing portions are opposed to the light emitting elements 1 or light receptor elements 2 respectively. According to this proposal, beams of light emitted from a light emitting portion 1a are properly oriented by the focusing portion 9a located ahead, and the optical directivity is improved. Additionally, the focusing portion 9a placed in front of the receptor portion 2a converges the flux of incident light to improve the detection efficiency.

OBJECT OF THE INVENTION

The prior art optical sensor, however, involves a problem that the convergent lens 104 associated with the light receptor elements 2 allows sunlight or other external turbulent light entering in the convergent lens 104 as well to reach the light receptor portions 2a. Therefore, the light receptor elements 2 erroneously detect light when their optical paths 5 are blocked. This means that the optical sensor has a bad signal-to-noise ratio which often invites an erroneous operation particularly in an automatic door which is usually exposed to the sun.

It is therefore an object of the invention to provide a light sensor having a good signal-to-noise ratio and effecting a reliable optical detection.

The prior proposal of the inventors also involves a problem. That is, although the focusing portion 9a in front of a light receptor portion 2a contributes to an improvement of the detection efficiency, it also invites that external turbulent light or other undesired light entering in the focusing portion 9a from angled forward directions to also reach the light receptor portion 2a. Therefore, there still exists room for improvement from the viewpoint of reliability.

It is therefore a further object of the invention to provide a coordinate system input device having an improved optical directivity and reliably preventing erroneous detection.

In the prior art configured to transmit light to the receptor portion 2a of each light receptor element 2 through a light hole 208a having a predetermined diameter, obtaining a required detection efficiency conflicts with obtaining a sufficient optical directivity of light entering in the light receptor element 2 from an associated light emitting element 1, and this often invites erroneous operation of the receptor elements caused by external light. Particularly, this tendency is increased by strong external light such as a flashlight or sunlight, and the light receptor elements 2 are sometimes damaged by strong light.

It is therefore a still further object of the invention to provide a coordinate system input device having an increased optical directivity and reliably preventing erroneous detection.

A yet further object of the invention is to provide a coordinate system input device which does not allow erroneous detection caused by external light, has a good light transmission ratio and does not have an increased number of parts.

In the aforegoing prior art coordinate system input device of optical detection type, light obliquely traveling from light emitting elements 1 located at an end portion of the array 214 is reflected by a central or other end portion of the wall surface of the infrared ray filter 9, and sometimes reaches the light receptor portion 2a of a light receptor element located at an end portion of the array 215. As the result, the device will operate erroneously, not detecting blockage of the optical path 5 by a finger 211 put near an outer margin of the operating area A.

A prior art coordinate system input device proposed to overcome the drawback includes a projection at a central position on the wall surface of the infrared ray filter 9 in an attempt to prevent reflected light from reaching the light receptor portion 2a. However, since this is not effective against reflections from the infrared ray filter 9 around the projection or from the base board 207 located at the back of the filter 9, the proposal is not a reliable countermeasure against such an erroneous detection.

It is therefore a yet further object of the invention to provide a coordinate system input device reliably preventing reflected light from reaching light receptor elements and hence reliably preventing erroneous detection.

SUMMARY OF THE INVENTION

A first technical arrangement of the invention to attain some of the objects is an optical sensor including light emitting elements and light receptor elements both made of optical semiconductive elements and opposed and spaced by a predetermined distance to form optical paths therebetween so as to detect whether any of the optical paths is blocked or not, and the optical sensor is characterized in that an optical conductive member having one end surface opposed to the optical semiconductor elements and having a light absorbing portion extending in a substantially parallel direction to the optical paths.

A second technical arrangement of the invention to attain some of the objects is a coordinate system input device of optical detection type which includes a rectangular array of optical elements consisting of a number of light emitting elements and light receptor elements of optical semiconductive elements aligned in respective arrays, and an infrared ray filter or other visible ray removing filter located inward of the array of optical elements. The coordinate system input device is particularly characterized in that the visible ray removing filter has optical conductive portions at positions corresponding to respective optical semiconductive elements along the surface of the filter opposed to the array of the optical elements, and that each optical conductive portion has one end surface opposed to an associated optical semiconductive element and a light absorbing portion extending in the length direction along the circumferential surface thereof.

A third technical arrangement of the invention to attain some of the objects is a coordinated system input device of optical detection type which includes a rectangular array of optical elements consisting of a number of light emitting elements and light receptor elements of optical semiconductive elements aligned in respective arrays, and an infrared ray filter or other visible ray removing filter located inward of the array of optical elements. The coordinate system input device is particularly characterized in that a shield member having an optical anisotropy is provided at least in the front of light receptor elements among the array of optical elements.

A fourth technical arrangement of the invention to attain some of the objects is a coordinate system input device of light detection type which includes a rectangular array of optical elements consisting of a number of light emitting elements and associated light receptor elements which are aligned in respective arrays to form optical paths between the light emitting elements and light receptor elements on a display surface of a display device, so that by detecting the position of blocked one of the optical paths, a corresponding coordinate system position on the display surface is inputted. The coordinate system input device is particularly characterized in that a light shield member having an optical anisotropy to selectively transmit light according to its entering angle and having light transmitting portions made by mixing visible light absorbing dye is provided at least in front of the light receptor elements among the array of the optical elements.

A fifth technical arrangement of the invention to attain some of the objects is a coordinate system input device of optical detection type which includes a frame-shaped array of optical elements consisting of arrays of a number of light emitting elements and arrays of a number of associated light receptor elements, and a filter such as an infrared ray filter located inward of the array of optical elements to remove undesired light, so that optical paths are formed between the light emitting elements and light receptor elements on a display surface of a display device, and so that the position of a blocked optical path is detected as a corresponding coordinate system position on the display surface. The coordinate system input device is particularly characterized in the use of a light shield member including transmission limiting portions made by alternatingly piling a number of layers of transparent and opaque materials in parallel to selectively transmit specific light having a proper incident angle and characterized in that the interfaces between the transparent and opaque materials extend perpendicularly to the array of the optical elements.

According to the first technical arrangement, beams of light oriented toward the circumferential surface of the optical conductive member entering from the end surface to the interior of the optical conductive element makes an incident angle with respect to the light absorbing portion smaller than a critical angle, and its reflection is completely prevented accordingly. Therefore, the light receptor elements merely receive specific light having a specific orientation, and the optical directivity is significantly improved. In other words, the signal-to-noise ratio of the device is improved by absorbing undesired components of light entering through undesired angles.

According to the second technical arrangement, beams of light oriented toward the circumferential surface of the optical conductive member passing through the optical conductive portion of the visible ray removing filter later at angles with respect the light absorbing portion smaller than a critical angle, and their reflection is completely prevented. Therefore, the light receptor elements merely receive specific light components having specific orientations, and the optical directivity is significantly improved to minimize erroneous detection.

According to the third technical arrangement, since undesired external light oriented to the light receptor elements is blocked by the shield member having an optical anisotropy, the light receptor elements merely receive specifically oriented light components. Therefore, the optical directivity is significantly improved, and the device is most unlikely to invite problems caused by external turbulent light.

According to the fourth technical arrangement, the shield member having an optical anisotropy blocks undesired external light oriented to the light receptor elements, and significantly improves the optical directivity. Further, since the visible light absorbing dye is mixed in the light transmitting portions of the light shield member, it is not necessary to provide an infrared ray filter or other visible ray removing filter in front of the light shield member. This contributes to a reduction in scale and manufacturing cost of the device.

According to the fifth technical arrangement, the light shield member having an optical anisotropy and located in front of the light receptor elements at corner portions of the array of optical elements permits that light components having substantially parallel orientations with respect to the interfaces between the transparent and opaque materials of the transmission limiting portions of the light shield member to pass through the light shield member and reach the light receptor elements. However, light components reflected by the wall surfaces of the undesired ray removing filter or other light components coming to the light shield member through oblique angles are blocked by the opaque member and cannot pass through the light shield member. Therefore, the optical directivity is improved, and erroneous operation of the device caused by erroneous detection of reflected light is significantly decreased.

BRIEF DESCRIPTION OF THE DRAWINGS

FIGS. 1 and 3 are views for explanation of a first technical arrangement of the invention, in which FIG. 1 is a fragmentary cross-sectional view of an optical sensor taken along a line including a light receptor element, and FIG. 3 is a cross-sectional view of an optical conductive element;

FIGS. 4 through 7 are views for explanation of the second technical arrangement of the invention, in which FIG. 4 is a fragmentary cross-sectional view of a coordinate system input device taken along a line including a light receptor element, FIG. 5 is a broken perspective view of an infrared ray filter, FIG. 6 is a cross-sectional view of the infrared ray filter, and FIG. 7 is a cross-sectional view of a modified infrared ray filter;

FIGS. 8 and 10 are views for explanation of a third technical arrangement of the invention, in which FIG. 8 is a fragmentary cross-sectional view of a coordinate system input device taken along a line including a light receptor element.

FIGS. 10 and 11 are views for explanation of a fourth technical arrangement of the invention, in which FIG. 10 is a fragmentary cross-sectional view of a coordinate system input device taken along a line including a light receptor element and FIG. 11 is a cross-sectional view of a light shield member included in FIG. 10;

FIGS. 12 and 13 are views for explanation of a fifth technical arrangement of the invention, in which FIG. 12 is a view showing a fragmentary arrangement of a coordinate system input device, and FIG. 13 is a view for explanation of a light shield member included in FIG. 12.

DETAILED DESCRIPTION

Figure 1:
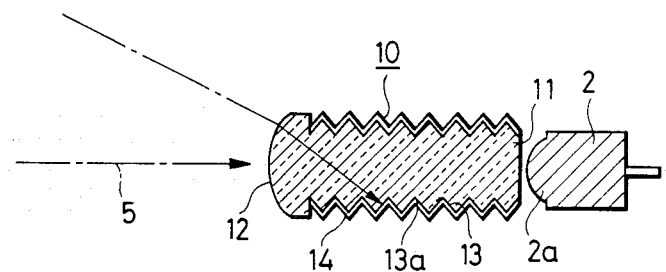

A first technical arrangement of the invention is described hereinbelow, referring to an embodiment illustrated in the drawings.

FIG. 1 is a cross-sectional view of an optical sensor embodying the invention, taken along a line including a light receptor element. An optical conductive member 10 made of rod-shaped acrylic resin is provided in front of light receptor elements 2 to selectively transmit infrared rays. The light conductive member 10 has one end surface 11 opposed to a light receptor portion 2a of the light receptor element 2 and the other end surface having a curved lens surface 12 opposed to and spaced from light emitting elements (not shown). The light conductive member 10 is provided with grooves 13a having a V-shaped cross-section along its outer circumferential surface 13 to totally form a corrugated configuration, and the circumferential surface 13 is coated by carbon black or other light absorbing material. Since the grooves 13a on the circumferential surface 13 are formed with walls substantially perpendicular to optical paths 5 of light coming from the light emitting element, the circumferential surface 13 extending substantially parallel to the optical path 5 (in the left-to-right direction in the illustration) has a configuration of saw teeth.

Figure 2:
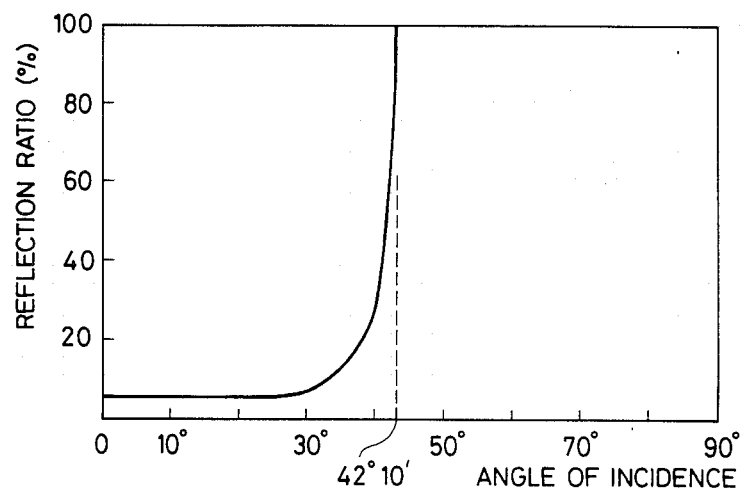
FIG. 2 is a characteristic graph showing the reflection ratio of light coming from the interior of acrylic resin to the air to explain first and second technical arrangements of the invention.

When a beam of light (infrared ray) not aligned with the optical path 5 enters from the left hand of the illustration in the light conductive member 10 through the lens surface 12, it advances toward the circumferential surface 13 of the optical conductive member 10. However, since the critical angle reflection of light from the interior of acrylic resin toward the air is 42°10′ as shown in FIG. 2, the incident angle of light coming through the lens surface 12 toward the corrugated circumferential surface 13 seldom exceeds the critical angle, and the reflection ratio at the circumferential surface 13 is very small. Therefore, sunlight or other external turbulent light entering in the optical path 5 is absorbed by the light absorbing material 14 provided on the circumferential surface 13, and never reaches the light receptor portion 2a of the light receptor element 2. In other words, only the light components emitted from the light emitting element and passing the optical path 5 can reach the light receptor portion 2a. This significantly increases the optical directivity of the device.

The use of the optical conductive member 10 located in front of the light receptor element 2 of the optical sensor prevents the light receptor element 2 from receiving light not aligned with the predetermined optical path 5, and prevents erroneous operation caused by sunlight or other external turbulent light. Additionally, since the light entering surface of the optical conductive member 10 is the lens surface 12 to converge the flux of light entering from the light emitting elements with an expansion to a diameter smaller than the diameter of the light receptor portion 2a, the detection efficiency of the device is also improved.

In the illustrated embodiment, the optical conductive member 10 is located in front of the light receptor element 2. However, the same optical directivity and detection efficiency are obtained also when the optical conductive member 10 is located in front of the light emitting elements.

Figure 3:
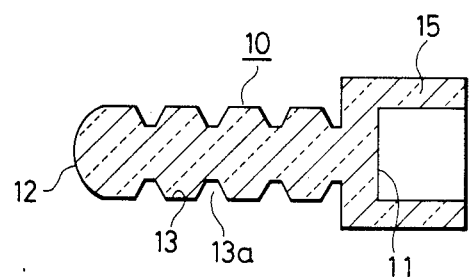

FIG. 3 is a cross-sectional view of another form of optical conductive member in which the same or similar parts to those of FIG. 1 are designated by the same reference numerals. The optical conductive member 10 of FIG. 3 is different from that of FIG. 1 in that the grooves 13a on the circumferential surface 13 thereof has a trapezoid cross-section and that an element fixing portion 15 is integrally formed at one end of the optical conductive member 10 to mount the light emitting elements and light receptor elements therein.

The second technical arrangement of the invention is described below, referring to an embodiment illustrated in the drawings.

Figure 4:
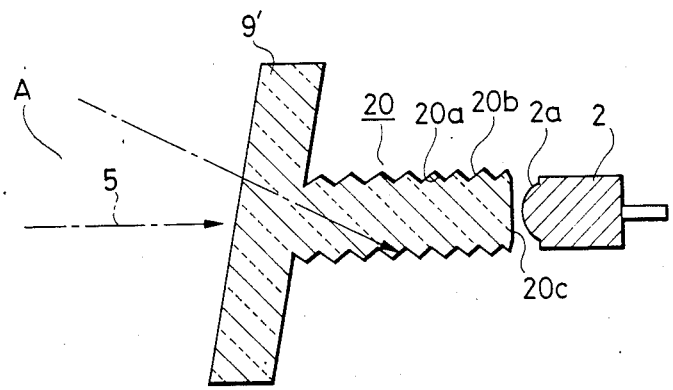
Figure 5:
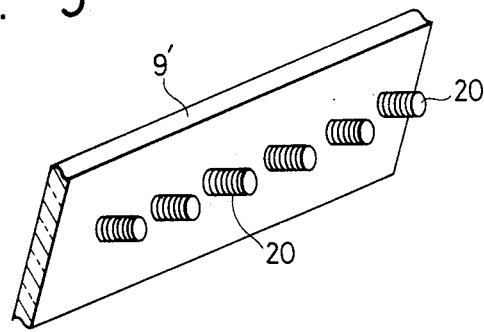
Figure 16:
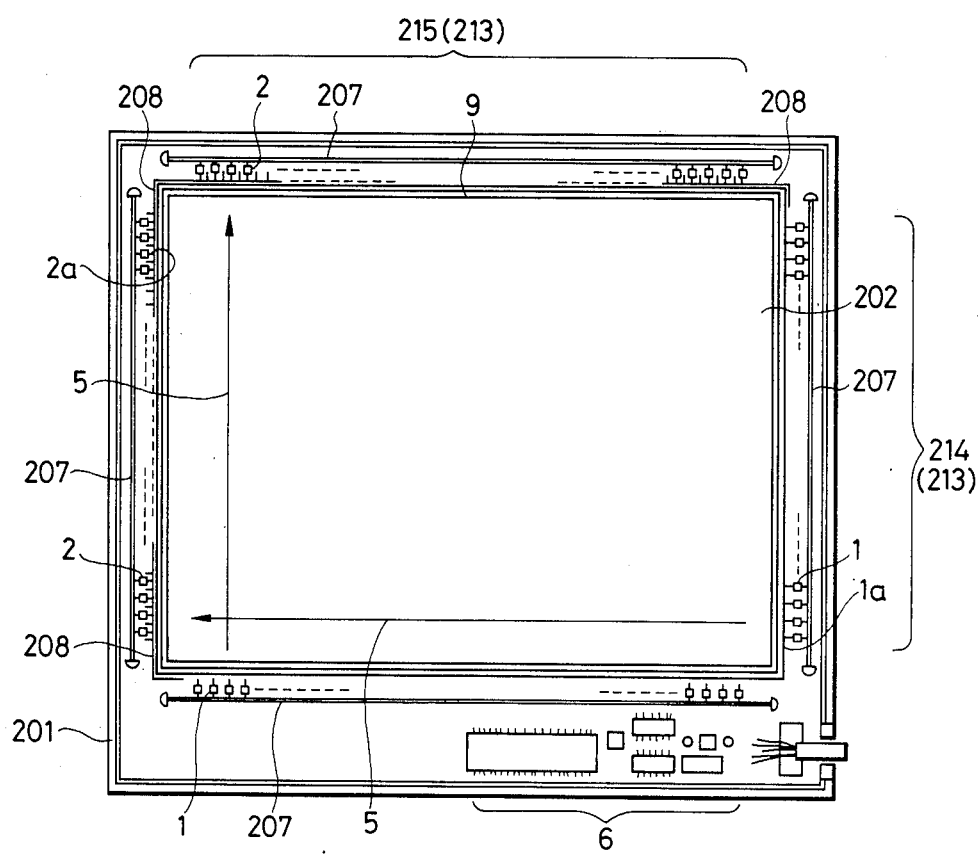
Figure 17:
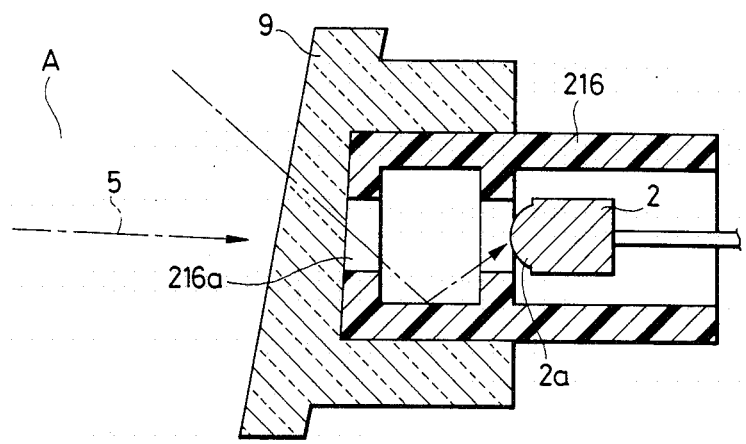
Figure 18:
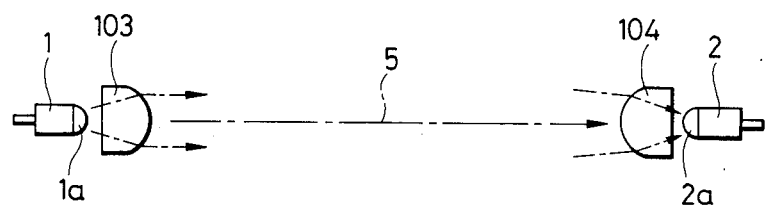
Figure 19:
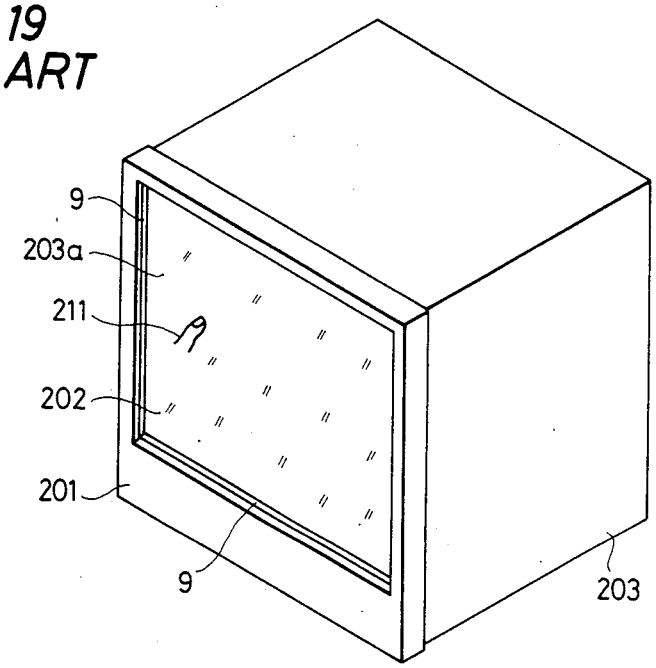
Figure 20:
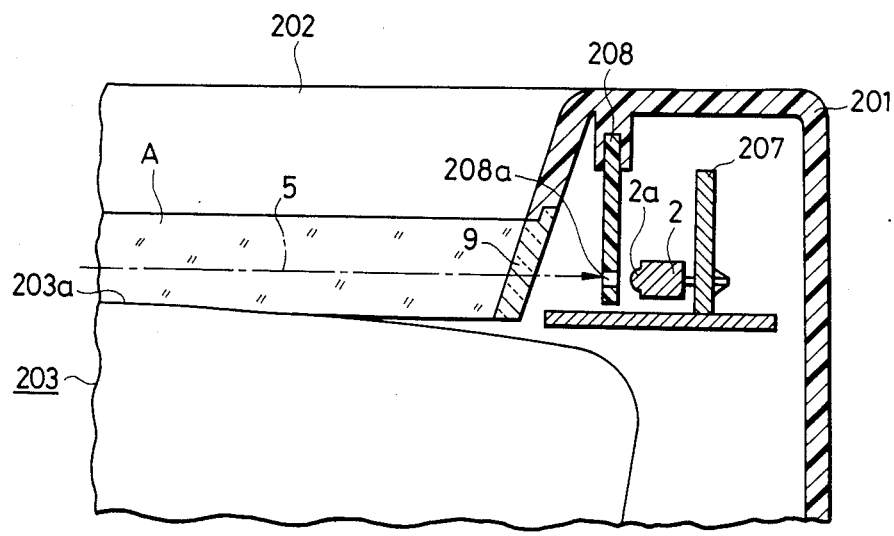

FIGS. 4 and 5 are views for explanation of an embodiment of the invention, in which FIG. 4 is a fragmentary cross-sectional view of a coordinate system input device taken along a line including a light receptor element, and FIG. 5 is a fragmentary perspective view of an infrared ray filter. In these drawings, identical or similar members to those of FIGS. 16, 19 and 20 are designated by the same reference numerals.

An infrared ray filter 9′ made from acrylic resin and mounted inward of the frame-shaped array of the optical elements to serve as a visible ray removing filter has one surface opposed to the array of optical elements, i.e. a surface remote from the operating area A on which a number of aligned rod-shaped optical conductive portions 20 project toward respective optical conductive elements. The optical conductive portions 20 are made from acrylic resin in a unitary body with the infrared ray filter 9′, and has circumferential surfaces 20a each provided with V-shaped circumferential grooves 20b to totally form a corrugated configuration. The circumferential surfaces 20 are coated by carbon black or other light absorbing material.

Therefore, the infrared ray filter 9 located in front of the array of light receptor elements, for example, is provided with optical conductive portions 20 at positions corresponding to respective light receptor elements 5, and an end surface 20c of each optical conductive portion 20 is opposed to an associated light receptor portion 2a. Since the grooves 20b forming a corrugated configuration on the circumferential surface 20a of the light conductive portion 20 are formed with walls substantially perpendicularly to the axial direction of the light conductive portion 20 substantially parallel to the optical path 5, the circumferential surface 20a extending in the axial direction of the optical conductive portion 20 has a configuration of saw teeth as shown in FIG. 4.

When a beam of light not aligned with the optical path 5 enters from the operating area A in the optical conductive member 20 through the infrared ray filter 9′, it advances toward the circumferential surface 20a of the optical conductive portion 20. However, since the critical angle of light from the interior of acrylic resin toward the air is 42°10′ as shown in FIG. 3, the incident angle of light entering through the infrared ray filter 9 toward the corrugated circumferential surface 20a seldom exceeds the critical angle, and the reflection ratio at the circumferential surface 20a is very small. Therefore, external turbulent light or other undesired light entering in the optical conductive member 20 through a course other than the optical path 5 is absorbed by the light absorbing material provided on the circumferential surface 20a, and never reaches the light receptor portion 2a of the light receptor element 2. In other words, only the light components coming through the predetermined optical path 5 defined by associated light emitting element and light receptor element can reach the light receptor portion 2a. This significantly increases the optical directivity of the device.

The same result is obtained by an infrared ray filter 9 combined with the light emitting elements. More specifically, of the light emitted from the light emitting portion in the optical conductive portion 20, light components oriented toward the corrugated circumferential surface 20a are seldom reflected but rather absorbed by the light absorbing material. Therefore, only specific light orienting a specific direction is emitted to the operating area A, and the optical directivity of the device is increased.

The use of the optical conductive portions 20 projecting from the infrared ray filter 9' significantly improves the optical directivity, and reliably prevents erroneous detection. Beside this, since the optical conductive portions 20 are formed in a unitary body with the infrared ray filter 9', there is no increase in the number of parts nor complicated assembling work.

Figure 6:
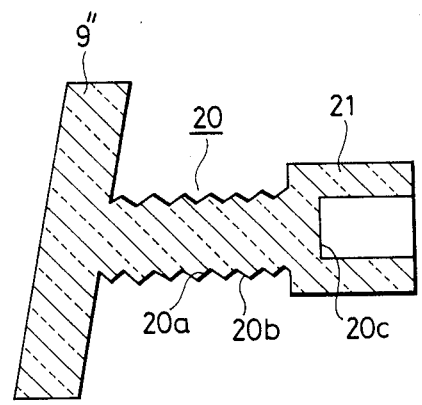

FIG. 6 is a cross-sectional view of another form of infrared ray filter in which structural details corresponding to those of FIG. 4 are designated by the same reference numerals. An infrared ray filter 9" has optical conductive portions 20 projecting therefrom and each including one end provided with an element fixing portion 21 formed integrally to mount the light emitting elements and light receptor elements therein.

Figure 7:
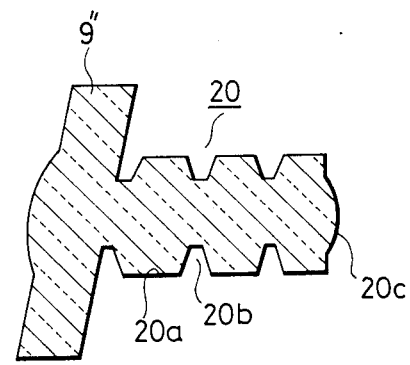

FIG. 7 is a cross-sectional view of a still further form of infrared ray filter in which the grooves 20b formed on the circumferential surface 20a of the optical conductive portion 20 has a configuration different from those in the aforegoing two forms of infrared ray filter. Also, an end surface of the infrared ray filter 9''' opposed to the operating area and an end surface 20c of the optical conductive portion 20 are both shaped to lens surfaces to improve the detection efficiency.

The third technical arrangement of the invention is described below, referring to an embodiment illustrated in the drawings.

Figure 8:
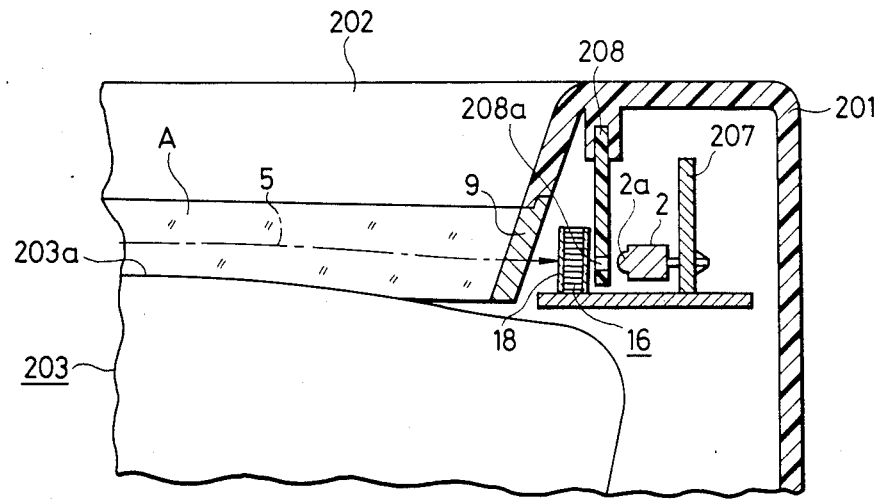
Figure 9:
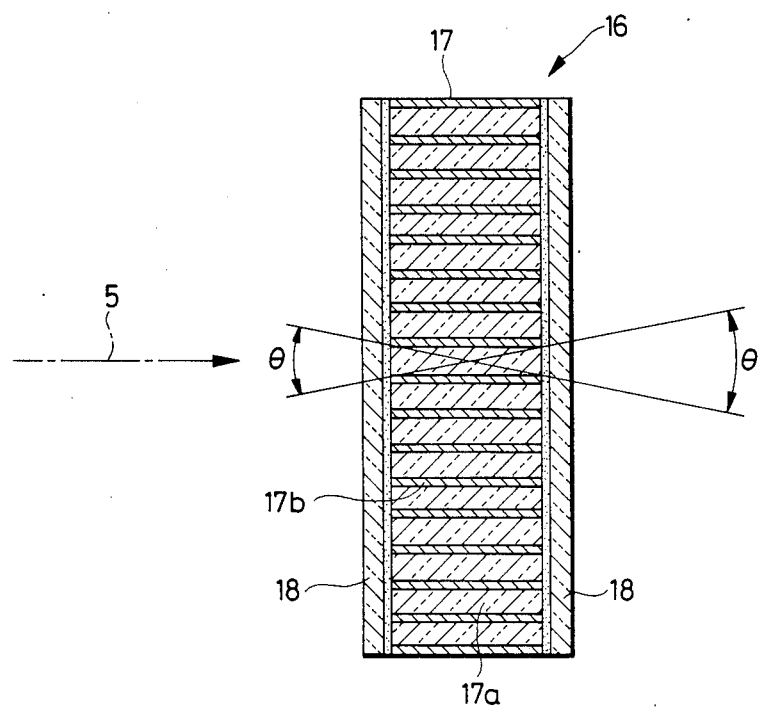
FIG. 9 is a cross-sectional view of a light shield member included in FIG. 8.

FIGS. 8 and 9 are views for explanation of an embodiment of the invention, in which FIG. 8 is a fragmentary cross-sectional view of a coordinate system input device taken along a line involving the light receptor elements, and FIG. 9 is an explanatory view of a light shield member used in FIG. 8. In these drawings, parts or members identical or similar to those of FIGS. 16, 19 and 20 are designated by the same reference numerals.

As shown in FIG. 8, a light shield 208 having light hole 208a of a predetermined diameter is located in front of the light receptor portions 2a of the light receptor elements 2 so that a light receptor portion 2a can receive incident light only coming from an associated light emitting element. Between the light shield 208 and the infrared ray filter 9 is interposed a light shield member 16 in association with an array of the light receptor elements 2. The light shield member 16 has a configuration shown in FIG. 9 in which a light shield portion 17 at the center and a pair of support plates 18 at both sides thereof are united together. The light shield portion 17 consists of a number of elongated black resin bars 17b aligned in parallel at spaced intervals and imbedded in a transparent resin material 17a, and the support plate 18 are made from polycarbonate or other transparent films.

When a beam of light not aligned with the optical path 10 enters from the operating area A in the light shield member 16 through the infrared ray filter 9, its components within the illustrated angle θ pass through one support plate 18, a small gap between the block resin bars 17b and the other support plate 18, and subsequently reach the light receptor portion 2a of the light receptor element 2. If components of light coming through a course outside the angle θ enters in the light shield member 16 through the infrared ray filter 9, they are blocked by the black resin bars 17b and never reach the light receptor element 2. The angle θ (visible angle) in the embodiment is 10 degrees. The light path 5 passing the center of the visible angle θ among others provides the maximum transparency whereas any external light entering the light shield member 16 through a course outside the visible angle θ is blocked by the light shield member 16 and never reaches the light receptor element 2. In other words, the only light aligned with a predetermined optical path 5 defined by associated light emitting element and light receptor element can reach the light receptor portion 2a, and the optical directivity of the device is significantly increased.

The visible angle θ may be changed as desired by changing the width and alignment angle of the black resin bars 17b.

The fourth technical arrangement of the invention is described below, referring to an embodiment illustrated in the drawings.

Figure 10:
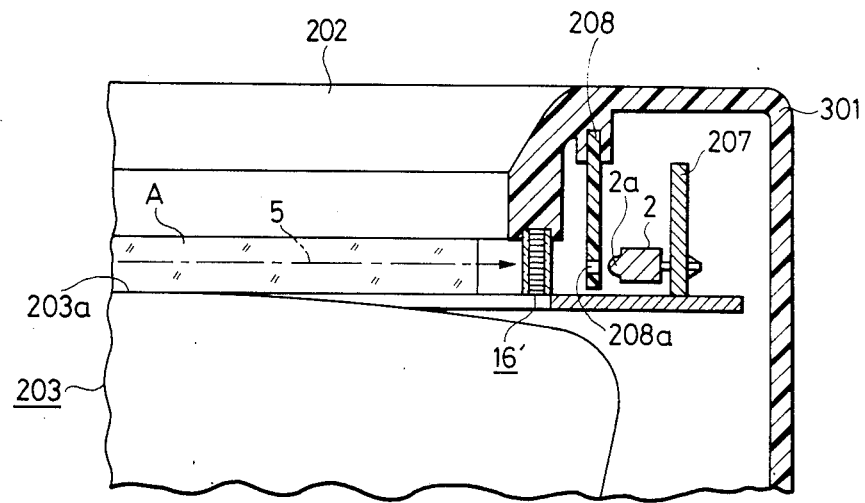
Figure 11:
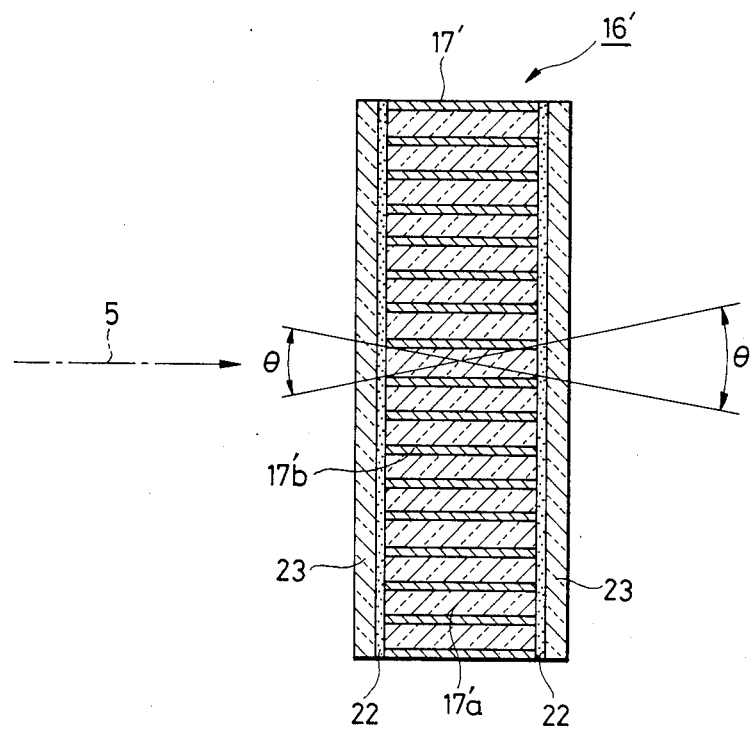

FIGS. 10 and 11 are views for explanation of an embodiment of the invention, in which FIG. 10 is a fragmentary cross-sectional view of a coordinate system input device taken along a line involving the light receptor elements, and FIG. 10 is an explanatory view of a light shield member used in FIG. 10. In these drawings, parts or members identical or similar to those of FIGS. 16, 19 and 20 are designated by the same reference numerals.

As shown in FIG. 10, a plate-shaped light shield member 16' fixed at one end of a frame body 201 is located in front of light receptor portion 2a of the light receptor element 2 via a light shield plate 208 having light holes 208a of a predetermined diameter. The light shield member 16' extends along an array of light receptor elements 2 (in a direction from front to back surface of the drawing paper in FIG. 10). The light shield member 16' has a configuration shown in FIG. 11 in which a transmission control portion 17' is sandwiched by a pair of support plates 23 adhered thereto by a transparent adhesive material 22. The transmission control portion 17' at the center consists of a number of silicone rubber layers 17'a including visible light absorbing dye and a number of elongated black resin bars 17'b which are in an alternating and parallel alignment. The visible light absorbing dye may be "Solvent Green 28" (color index name) disclosed in Japanese Laying-Open Publication No. 61-18576 as an anthraquinone dye. If this is mixed by 0.1 to 1.0 weight percentage, the silicone rubber layers 17a never prevents transmission of near infrared rays but substantially prevents transmission of visible rays. The embodiment employs polycarbonate resin in the form of a transparent film as the support plate 23.

Near infrared rays coming from the operating area A to the light shield member 16' within the illustrated angle θ are never blocked by the black resin bars 17'b and can pass through the silicone rubber layers 17'a. Therefore, they reach the light receptor portion 2a of the light receptor element 2 through the support plates 23 and transparent adhesive 22. However, visible rays entering in the light shield member 16' within the angle θ are blocked by "Solvent Green 28" (color index name) mixed in the silicone rubber layers 17'a and cannot reach the light receptor portion 2a. On the other hand, any light as well as near infrared rays entering in the light shield member 16' through a course outside the angle θ is blocked by the black resin bars 17'b and never reaches the light receptor portion 2a.

Since the angle θ (visible angle) in the embodiment is 10 degrees, and the silicone rubber layers 17'a include visible light absorbing dye, only near infrared rays having an entering angle more than 85 degrees can pass through the light shield member 16'. Therefore, near infrared rays entering in the light shield member 16' through a predetermined optical path 5 defined by associated light emitting element and light receptor element 2 can reach the light receptor portion 2a because its incident angle is about 90 degrees which is in the range of the visible angle θ. On the other hand, external light or other entering light toward the light shield member 16' through a course outside the visible angle θ cannot reach the light receptor portion 2a. Therefore, the optical directivity of the device is significantly increased. Further, since the device of FIGS. 10 and 11 has the same visible ray removing function as that of the infrared ray filter in the prior art coordinate system input device and does not require any specific infrared ray filter in front of the light shield member 20, it decreases superficial reflection and improves the light transmitting ratio. Additionally, the number of parts of members is decreased.

In the aforegoing description, visible light absorbing dye is mixed in the silicone rubber layers 17'a of the light shield member 16'. However, the same result is obtained by mixing the visible light absorbing dye in other light transmitting portions of the light shield member 16'. For example, "Solvent Green 28" (color index name) may be mixed in the transparent adhesive 22, or alternatively, another anthraquinone dye disclosed in Japanese Laying-Open Publication No. 61-5203 may be mixed in the support plate 23 made from polycarbonate resin.

The visible angle θ may be changed as desired by changing the width of the transmission control portion 17' or the thickness of the black resin bars 17'b.

Figure 13:
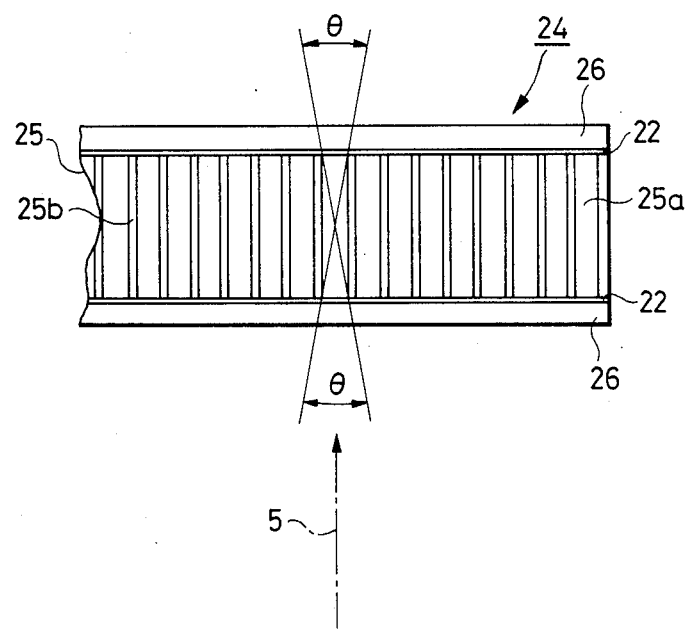
Figure 12:
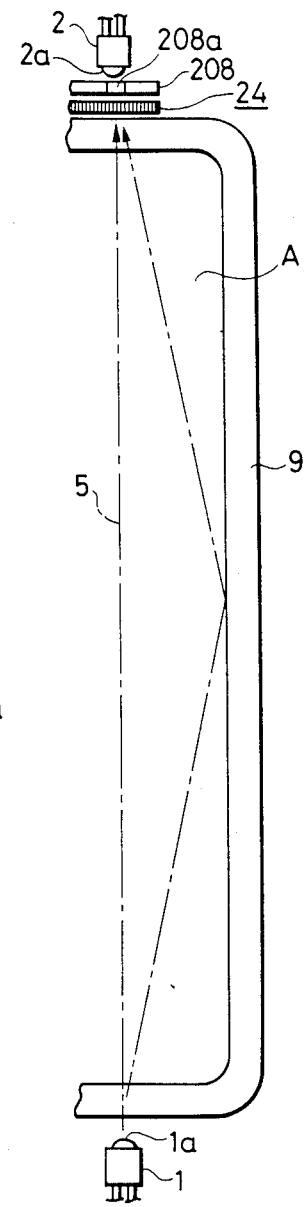
Figure 14:
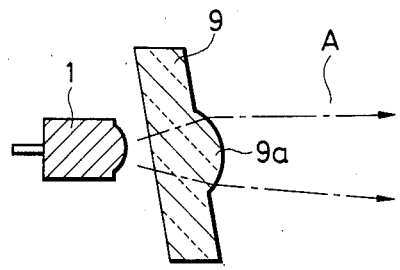
FIGS. 14 through 20 illustrate prior art arrangements.
Figure 15:
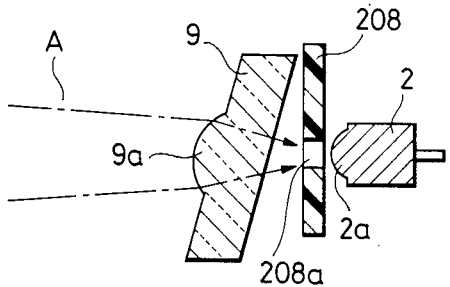

FIGS. 12 and 13 are views for explanation of a further modification of the invention, in which FIG. 12 is a fragmentary front elevation of a coordinate system input device, and FIG. 13 is an explanatory view of a light shield member used in FIG. 12. In these drawings, members or parts equivalent to those of FIGS. 16, 19 and 20 are designated by the same reference numerals.

As shown in FIG. 12, a plate-shaped light shield member 24 is located in front of the light receptor elements 2 at an end portion via a light shield plate. A frame-shaped infrared ray filter 9 is mounted in front of the light shield member 24 and light emitting elements, i.e. throughout the entire length encircling the operating area A. The light shield member 24 has a configuration shown in FIG. 13 in which a transmission control portion 25 is sandwiched by a pair of support plates 26. This is known as "light control film". The transmission control portion 25 at the center consists of a number of silicone rubber or other transparent resin layers 25a and a number of elongated black resin bars 25b which are in alternating and parallel alignment at a predetermined pitch. The transparent resin layers 25a and black resin bars 25b are disposed so that their interfaces extend perpendicular to the array of the light receptor elements 2, and the light shield member 24 is located in front of the array of the light receptor elements 24. In other words, at positions where the light shield member 24 is present, the transparent resin layers 25a and black resin bars 25b are alternatingly aligned at a small interval along the outer margin of the operating area A.

A beam of light entering from the operating area A in the light shield member 24 within the illustrated angle θ passes through one support plate 26 and passes through the transparent resin layer 25a under no blockage by the black resin bar 25b. The same light can subsequently pass through the other support plate 26 and reach the light receptor portion 2a of the light receptor element 2. On the other hand, any light entering in the light shield member 24 through a course outside the angle θ is blocked by the black resin bars 25b and never reaches the light receptor portion 2a. The angle θ (visible angle) in the embodiment is 10 degrees so that light having an entering angle more than 85 degrees can pass through the light shield member 24. Therefore, any light entering in the light shield member 24 through a predetermined light path 5 defined between associated light emitting element 1 and light receptor element 2 can reach the light receptor portion 2a because its angle of incidence is about 90 degrees which is within the visible angle θ. However, any light obliquely entering in the light shield member 24 such as light reflected by the wall surface of the infrared ray filter 9 extending substantially parallel to the light path 5 cannot reach the light receptor portion 2a because its angle of incidence is outside the visible angle θ. Therefore, erroneous detection caused by reflected light is reliably prevented.

This result is obtained by simply providing the light shield member 24 in front of the light receptor elements 2 at an end portion which are particularly subject to influences of reflected light among the frame-shaped array of optical elements consisting of arrays of a number of light emitting elements 1 and light receptor elements 2. However, the optical directivity is further increased if the light shield member 24 is also provided in front of light emitting elements 1 at an end portion, or alternatively, if the light shield member 24 is provided throughout the entire length of the array of optical elements.

The visible angle θ of the light shield member 24 may be changed as desired by changing the thickness of the transmission control portion 25 or the thickness of the black resin bars 25b.

It will be apparent to any artisan in the field that two or more of the first to fifth technical arrangements of the invention may be selectively combined to meet best with a present circumstance including location or structure of a light path blockage detecting device.

According to the first technical arrangement of the invention in which the light conductive member is provided in front of the light emitting elements and light receptor elements to prevent all reflections of light by the circumferential surface, only specific beams of light orienting specific directions are emitted or received. Therefore, the optical directivity of the device is significantly improved, and a reliable light sensor with a good signal-to-noise ratio is obtained.

According to the second technical arrangement of the invention in which the optical conductive portions project from an infrared ray filter or other visible light removing filter at position corresponding to respective light semiconductive elements to prevent all reflections of light by the circumferential surface, only specific beams of light orienting specific directions are emitted or received. Therefore, the optical directivity of the device is significantly improved, and a reliable coordinate system input device with no erroneous detection is obtained.

According to the third technical arrangement of the invention in which the light shield member having an optical anisotropy is provided in front of the light receptor elements, only specific beams of light are received, and other undesired light such as external light is blocked. Therefore, a reliable coordinate system input device with no erroneous detection is obtained.

According to the fourth technical arrangement of the invention in which the light shield member having an optical anisotropy blocks undesired light orienting the light receptor elements, the optical directivity of the device is improved, and erroneous detection caused by external light is reliably prevented. Further, since the light shield member includes visible light absorbing dye in its light transmitting portion, it is not necessary to provide any infrared ray filter or other visible light removing filter in front of the light shield member. Therefore, there is no decrease in the light transmission ratio nor any increase in the number of parts.

According to the fifth technical arrangement of the invention, the light shield member having an optical anisotropy blocks any light entering through oblique angles, such as light reflected by the wall surface of the infrared ray filter, and permits only specific light oriented toward specific directions to pass through. The optical directivity of the device is significantly improved, and any erroneous detection caused by reflected light is reliably prevented.

What is claimed is:

1. In an optical path blockage detecting device of the type having an array of light emitting elements facing opposite respective ones of an array of light receptor elements at a predetermined distance and defining optical paths of light beams transmitted between associated pairs of light emitting and receiving elements, and means for detecting whether any of the optical paths is blocked by an interposed object, the improvement comprising:
a light shielding member disposed between each respective pair of light emitting and receptor elements in front of said light receptor element, and formed by a solid elongated body made of an optically transmissive material extending in parallel with the optical path,
wherein said elongated body has a front end facing toward the associated light emitting element, a rear end facing opposite the light receptor element, and an outer circumferential surface concentric with the optical path which has a corrugated shape forming inclined walls for reflecting a light beam entering the front end of said light shielding member from an incident angle greater than a predetermined critical range, and a layer of light absorbing material coated on the outside of said circumferential surface for absorbing a light beam entering the front end of said light shielding member from an incident angle within the critical predetermined range which is not substantially aligned with the optical path.

2. An optical path blockage detecting device according to claim 1, wherein said corrugated shape is formed by sawtoothed grooves.

3. An optical path blockage detecting device according to claim 1, wherein said corrugated shape is formed by trapezoid-shaped grooves.

4. An optical path blockage detecting device according to claim 1, wherein said rear end is integrally provided with a mounting portion for said light receptor element.

5. An optical path blockage detecting device according to claim 1, wherein the light shielding members for the associated pairs of light emitting and receptor elements are disposed in an array in parallel with said array of light receptor elements, and their front ends are integrally formed with an infared filter in a frame-shape extending along and mounting said array of light shielding elements.

6. An optical path blockage detecting device according to claim 1, wherein at least one of said front and rear ends includes a convex lens surface.

7. An optical path blockage detecting device according to claim 1, wherein said light shielding members are molded from acrylic resin.

8. In an optical path blockage detecting device of the type having an array of light emitting elements facing opposite respective ones of an array of light receptor elements at a predetermined distance and defining optical paths of light beams transmitted between associated pairs of light emitting and receiving elements, and means for detecting whether any of the optical paths is blocked by an interposed object, the improvement comprising:
a light shielding member disposed between each respective pair of light emitting and receptor elements in front of said light receptor element and formed by a plurality of elongated black resin layers alternatingly layered with light transmissive layers at spaced intervals which are stacked in parallel with each other and with the optical path of the light beam, for absorbing a light beam entering said light shielding member from an incident angle within a predetermined receiving range which is not substantially aligned with the optical path.

9. An optical path blockage detecting device according to claim 8, wherein said light transmissive layers are made of transparent resin.

10. An optical path blockage detecting device according to claim 8, wherein said light transmissive layers are made of silicone rubber including a visible light absorbing dye.

11. An optical path blockage detecting device according to claim 8, wherein said plurality of layer held between transparent resin support films.

12. In an optical path blockage detecting device of the type having an array of light emitting elements facing opposite respective ones of an array of light receptor elements at a predetermined distance and defining optical paths of light beams transmitted between associated pairs of light emitting and receiving elements, means for detecting whether any of the optical paths is blocked by an interposed object, and a rectangular frame-shaped infrared filter having four side walls defining an open area across which the light beams are transmitted, two opposing ones of said side walls of said filter being disposed in front of said array of light emitting elements and said array of light receptor elements, respectively, and two other side walls being disposed perpendicular to said arrays on oppositely facing sides of said two arrays, the improvement comprising:

a plate-shaped light shielding member extending in a longitudinal direction in parallel with, and disposed in front of, said array of light receptor elements at least in the vicinity of said two other side walls perpendicular to said arrays, said light shielding member being formed by a plurality of elongated black resin layers alternatingly layered with light transmissive layers at spaced intervals which are stacked along said longitudinal direction in parallel with each other and with the optical paths of the light beams, said alternating layers being spaced at intervals sufficient to block light entering said light shielding member at an incident angle greater than a desired visible angle, including any light from said array of light emitting elements which is reflected from one of said other side walls.

* * * * *

UNITED STATES PATENT AND TRADEMARK OFFICE
CERTIFICATE OF CORRECTION

PATENT NO. : 4,774,404

DATED : September 27,1988

INVENTOR(S) : Kazuo Hasegawa; Junichi Ohuchi; Hiroaki Sasaki

It is certified that error appears in the above-identified patent and that said Letters Patent is hereby corrected as shown below:

Claim 5; column 14, line 23, "infared" should be --infrared--.

Signed and Sealed this

Twenty-first Day of March, 1989

*Attest:*

DONALD J. QUIGG

*Attesting Officer*  *Commissioner of Patents and Trademarks*